United States Patent [19]

Kommrusch

[11] Patent Number: 5,552,783
[45] Date of Patent: Sep. 3, 1996

[54] CONSTANT CURRENT VOLTAGE RESTORATION

[75] Inventor: Steven J. Kommrusch, Ft. Collins, Colo.

[73] Assignee: Hewlett-Packard Company, Palo Alto, Calif.

[21] Appl. No.: 220,796

[22] Filed: Mar. 31, 1994

[51] Int. Cl.$^6$ ............................................. H03M 1/12
[52] U.S. Cl. .............................. 341/118; 341/155
[58] Field of Search ................................. 341/118, 119, 341/120, 121, 155, 139

[56] References Cited

U.S. PATENT DOCUMENTS 4,771,267  9/1988  Russell et al. ........................... 341/118

*Primary Examiner*—Brian K. Young

[57] ABSTRACT

A voltage shift feedback system offsets the signal amplitude of an incoming analog video signal so that a more accurate analog-to-digital conversion of the analog video signal can be achieved in an analog-to-digital convertor. The voltage shift feedback system comprises an input capacitor for isolating the system from the analog video signal and a feedback loop. The feedback loop comprises a separator mechanism in the preferred embodiment for determining when the analog video signal exhibits a particular amplitude, such as a blank level or a synchronization level, and for generating a separator output indicative thereof. An offset control logic monitors the digital pixel data output from the ADC and the separator output. A variable current mechanism is connected to the offset control logic and the ADC input connection for supplying a continuous current $i_c$ to the ADC input. When the analog video signal exhibits the particular amplitude, the offset control logic compares the digital pixel data from the ADC to a predetermined range, preferably a desired synchronization or blank amplitude range, and adjusts the current so that the digital pixel data converges toward the predetermined range.

16 Claims, 3 Drawing Sheets

CONSTANT CURRENT VOLTAGE RESTORATION

FIELD OF THE INVENTION

The present invention generally relates to graphics processing of analog video signals, and more particularly, to a system and method for optimally shifting or restoring the signal amplitude of an analog video signal so that a more accurate analog-to-digital conversion of the analog video signal is achieved.

BACKGROUND OF THE INVENTION

A typical analog video signal 11 for driving an analog video display is illustrated in FIG. 1. As shown in FIG. 1, the analog video signal 11 is a composite signal having lines of analog data 12 combined with other sweep and synchronization (sync) signals, which include blank levels referred to as a front porch 14a and a back porch 14b, and include a sync level 16. A blank period 14' is defined as a time period when the analog video signal 11 exhibits the front porch 14a, the sync level 16, and the back porch 14b, and a sync period 16' is defined as the time period in which the analog video signal 11 exhibits the sync level 16. The front porch 14a essentially cues the electron beam associated with a raster display to turn off when the beam sweeps from the end of a scan line to the beginning of the next scan line. The sync level 16 cues the electron beam to change either a scan line or a frame, depending upon its time period, and/or to reset counters and other support circuitry. When the sync level 16 cues a scan line, then it is referred to as a "horizontal sync" (Hsync). When the sync level 16 cues a frame, i.e., when it exhibits an extended time period, then it is referred to as a "vertical sync" (Vsync). Furthermore, the back porch 14b permits initialization of the electron beam and other support circuitry prior to acting upon a new scan line or frame.

If the analog video display is multicolor, then there would generally be one of the analog video signals 11 allocated to each color, such as for red, green, and blue. However, only one of the analog video signals, for instance, the one allocated to green, usually has the sync periods 16.

Recently, there has been a trend in the industry toward developing video displays which are driven by digital pixel data as opposed to analog video signals. An example of such a digital video display is the model LQ12D011 TFT LCD flat panel display manufactured and made commercially available by the Sharp Corporation, Japan. Thus, it has recently been desirable to convert the analog video signal 11 of FIG. 1 into digital pixel data for driving a digitally-controlled display. This process can be described graphically with reference to FIG. 1. Referring to FIG. 1, in the process of converting the analog video signal 11 into digital pixel data, the analog data 12 is converted to a series of digital codes, depending upon its amplitude at a given point in time. For Sharp's digital display device, the analog data 12, which typically represents 256 different intensity levels for a particular color, must be converted to only 8 intensity levels, as is represented in FIG. 1 by levels 0 through 7. The lowest possible color intensity level is commonly referred to as the "black" level, whereas the highest possible color intensity level is commonly referred to as the "white" level.

FIG. 2 illustrates a typical prior art input processing system 21 for converting the analog video signal 11 (FIG. 1) to a digital pixel data 22 on ADC output connection 23 is illustrated in FIG. 2. The input processing system 21 comprises the analog video signal 11 on a connection 18, which is transmitted to the input processing system 21 via a transmission line 24, commonly a coaxial cable or other like analog communications interface. A termination transistor $R_T$, for instance, 75 ohms, is generally connected between the input connection 26 at the end of the transmission line 24 and ground so as to minimize ringing on the transmission line 24. A capacitor C1 receives the incoming analog video signal 11 and generally isolates the input processing system 21 from the signal 11 so that the analog video signal 11 can be shifted, or offset. Further, an analog-to-digital convertor (ADC) 28 receives the analog video signal 11 from the capacitor C1 on the ADC input 27 and converts it to a corresponding digital pixel data 22 on the ADC output connection 23. The ADC 28 converts the analog video signal 11 to a digital pixel data 26 under the control and timing of a dot (pixel) clock signal 29 produced by a dot clock generator 32. The dot clock generator 32 produces the dot clock signal 29 based upon the spacing of sync periods 16 within the analog video signal 11.

The peak-to-peak amplitude, i.e., the distance between the sync level 16 to the white level, of the analog video signal 11 can vary by approximately 10% in typical systems as a result of line impedance, temperature, and other inherent characteristics. Unfortunately, this predicament results in an inaccurate conversion of the analog data 12 into the discrete levels 0–7 for the ultimate digital pixel data. For example, as shown in FIG. 1, if the analog data 12 is shifted downwardly, the analog data 12 at level 7, for example, could be shifted down to level 6, thereby resulting in loss of the color corresponding to level 7. In order to compensate for this possible 10% variation, many prior art systems have attempted to clamp the analog video signal 11 to an analog voltage level. A prior art clamp circuit 25 for this purpose is shown in FIG. 2.

Referring to FIG. 2, the input processing system 21 attempts to shift, or offset, the signal amplitude of the incoming analog video signal 11 so that the voltage swing of the analog video signal 11 more closely matches the voltage range of the ADC, which is defined by ADC reference voltages $V_{REF+}$, $V_{REF-}$. This shifting process is typically performed with a clamp circuit 25, as shown in FIG. 2. The clamp circuit 25 is connected at the ADC input connection 26 of the ADC 28 and insures that the ADC input connection 26 does not drop below a certain predetermined voltage level.

The clamp circuit 25 generally comprises, as shown in FIG. 2, a diode D1 connected to a voltage divider having resistors R1, R2, which is powered by a supply voltage $V_S$. When the voltage on the connection 27 drops below the predetermined voltage threshold, as defined by the diode D1, the diode D1 is turned on and current $i_0$ flows through the diode D1 onto the connection 27, thereby increasing the voltage level of the connection 27. This action effectively shifts the voltage swing of the analog video signal 11 by establishing an offset (DC) voltage on the capacitor C1. In the alternative, when the voltage on the connection 27 is above the predetermined voltage threshold, as defined by the diode D1, the diode D1 is turned off and current $i_0$ does not flow onto the connection 27. A clamp circuit similar to the foregoing input processing system 21 is set forth in Hans-Jurgen Desor ("Single Chip Video Processing System") *IEEE Transactions on Consumer Electronics*, August, 191, pages 182–189 and also in *Graphics and Imaging Products, Applications Handbook*, Brooktree Publications (1990).

However, the clamp circuits of the prior art, as are exemplified by the clamp circuit 25 in the input processing system 21 of FIG. 2, cause an offset voltage $V_T$ to appear across the termination transistor $R_T$ in the system 21 when the input processing system 21 injects current onto the ADC input connection 27 of the ADC 28. The offset voltage $V_T$ undesirably causes noise, spikes, and other distortion in the analog video signal 11, which adversely affects the operation of the input processing system 21 and ultimately the quality of the digital pixel data 22. Hence, a better approach is needed for shifting the incoming analog video signal 11 so that the aforementioned adverse effects are minimized.

SUMMARY OF THE INVENTION

Therefore, an object of the present invention is to overcome the deficiencies and inadequacies of the prior art as noted above and as generally known in the industry.

Another object of the present invention is to provide a system and method for optimally shifting the signal amplitude of an analog video signal so that a more accurate analog-to-digital conversion of the analog video signal is achieved.

Another object of the present invention is to provide a system and method for voltage restoration of an analog video signal prior to entry into an analog-to-digital convertor (ADC).

Another object of the present invention is to provide a system and method for shifting an analog video signal which is to be input to an ADC while minimizing potential voltage or current spikes.

Another object of the present invention is to provide a system and method for more precisely controlling translation of an analog video signal to a digital pixel data in an analog-to-digital converting system.

Briefly described, the present invention is a voltage shift feedback system for optimally shifting the voltage swing of an analog video signal so that a more accurate analog-to-digital conversion of the analog video signal is achieved. The voltage shift feedback system comprises an analog-to-digital convertor (ADC) for receiving the analog video signal from a transmission line or other source. The ADC convertor is isolated from the incoming analog video signal by an input capacitor to permit shifting of the analog video signal. The ADC generates digital pixel data from the analog video signal. A variable current mechanism supplies a current to the input capacitor and the analog video signal so that the analog video signal is shifted in amplitude. An offset control mechanism receives the digital pixel data and compares the digital pixel data to a predetermined range. In some embodiments of the offset control mechanism, the offset control mechanism compares the digital pixel data to a predetermined range when the digital pixel data exhibits a lowest value. In a first embodiment of the offset control mechanism, the predetermined range is a predetermined sync range. The first embodiment is used for cases where the analog video signal has sync levels. In a second embodiment of the offset control mechanism, the predetermined range is a predetermined blank range. The second embodiment is used in those cases where the analog video signal has no sync levels. As a result of the comparison, the offset control mechanism adjusts the current so that the digital pixel data converges toward the predetermined range. Hence, a feedback loop is implemented for more precisely shifting the analog video signal at the input of the ADC, thereby providing a more accurate analog-to-digital conversion of the analog video signal.

The voltage shift feedback system may also be provided with a separator mechanism for receiving the analog video signal and for generating a separator output indicative of when the analog video signal exhibits a particular amplitude, such as a blank level or a sync level. With this configuration, a either a third or fourth embodiment of the offset control mechanism is employed. The third embodiment of the offset control mechanism compares the digital pixel data to a predetermined sync range when the analog video signal exhibits the sync level, and the fourth embodiment of the offset control mechanism compares the digital pixel data to a predetermined blank range when the analog video signal exhibits the blank level.

In accordance with another feature of the present invention, the variable current mechanism continuously applies current to the analog video signal at the input of the ADC so that no voltage or current spikes are sensed by the ADC and so that the voltage level can be more tightly controlled. During steady state operation, the continuous current fluctuates very little, i.e., is characterized by very little AC activity, so that any voltage bias is blocked by the input capacitor and does not appear across the termination resistor $R_T$.

The present invention can also be broadly conceptualized as a method or process for shifting the signal amplitude of an analog video signal so that a more accurate analog-to-digital conversion of the analog video signal is achieved. The method comprises the following steps: converting the analog video signal to a digital pixel data; supplying a current to the analog video signal so that the analog video signal is shifted in amplitude; comparing the digital pixel data to a predetermined range (for instance, a predetermined sync or blank range when the digital pixel value exhibits its lowest value); and adjusting the current so that the digital pixel data converges toward the predetermined range. The foregoing method may be modified to include the following steps: determining when the analog video signal exhibits a particular amplitude, such as a blank level or sync level; and comparing the digital pixel data to a predetermined value when the analog video signal exhibits the particular amplitude.

In addition to accomplishing the objects set forth previously herein, the present invention has many other advantages, a few of which are set forth hereafter.

An advantage of the present invention is that it is simple in design, inexpensive to implement, and reliable in operation.

Another advantage of the present invention is that it provides for very tight, efficient, feedback control of an ADC, thereby resulting in optimum analog-to-digital conversion.

Another advantage of the present invention is that it is capable of implementation in a system having an ADC separated by a transmission line only by a capacitor or series of capacitors, unlike prior art clamping system which would cause instantaneous voltage jumps across the capacitor or series of capacitors.

Another advantage of the present invention is that it is extremely fast in operation and can be used in connection with high frequency analog video signals.

Other objects, features, and advantages of the present invention will become apparent to one of skill in the art upon examination of the following drawings and detailed description.

BRIEF DESCRIPTION OF THE DRAWINGS

The present invention can be better understood with reference to the following drawings. The drawings are not necessarily to scale, emphasis instead being placed upon clearly illustrating the principles of the present invention.

DETAILED DESCRIPTION OF THE PREFERRED EMBODIMENT

Figure 2:
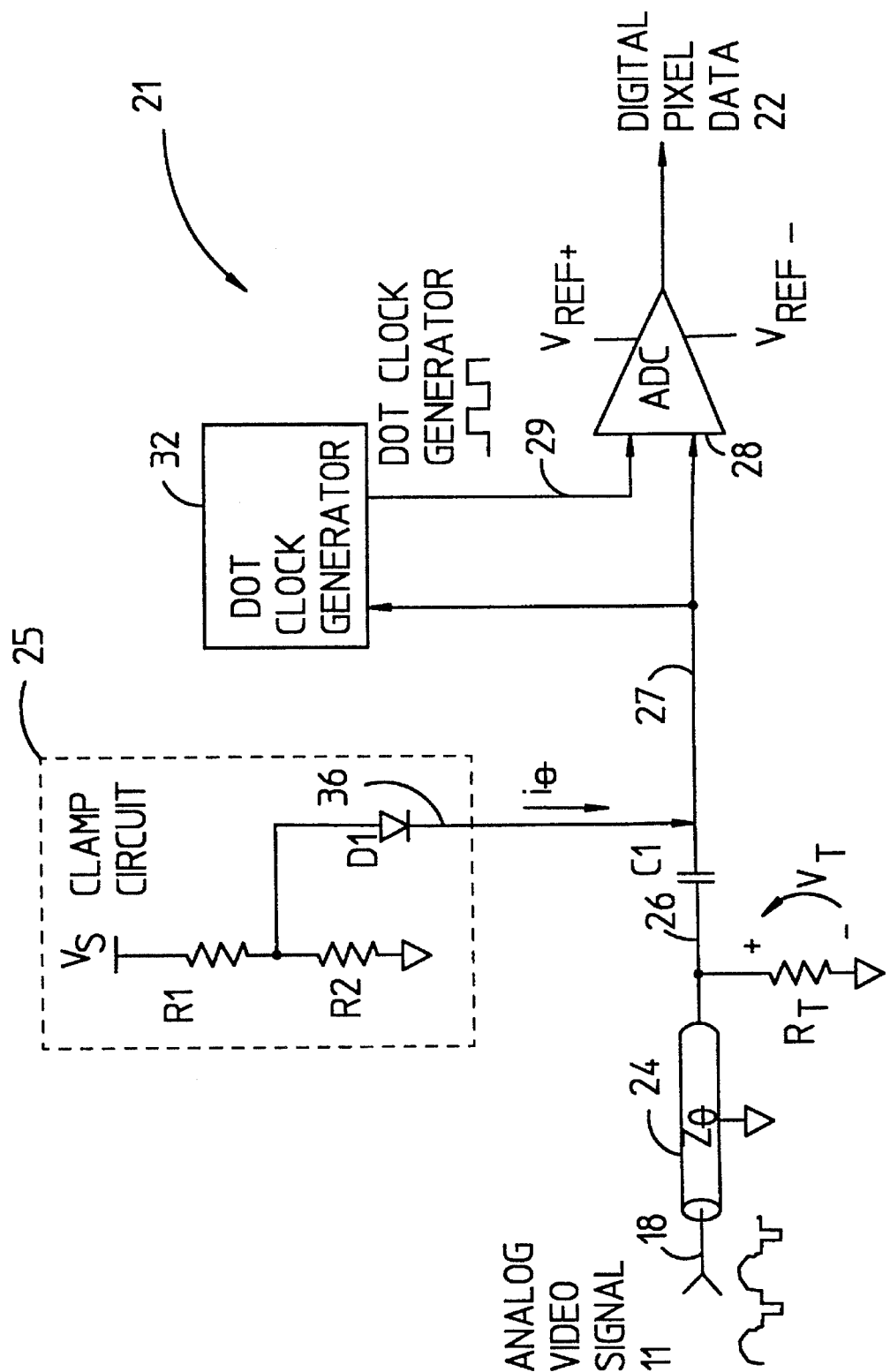
FIG. 2 is a schematic circuit diagram of a prior art clamping system implemented in a system for converting an analog video signal to a digital pixel data.
Figure 3:
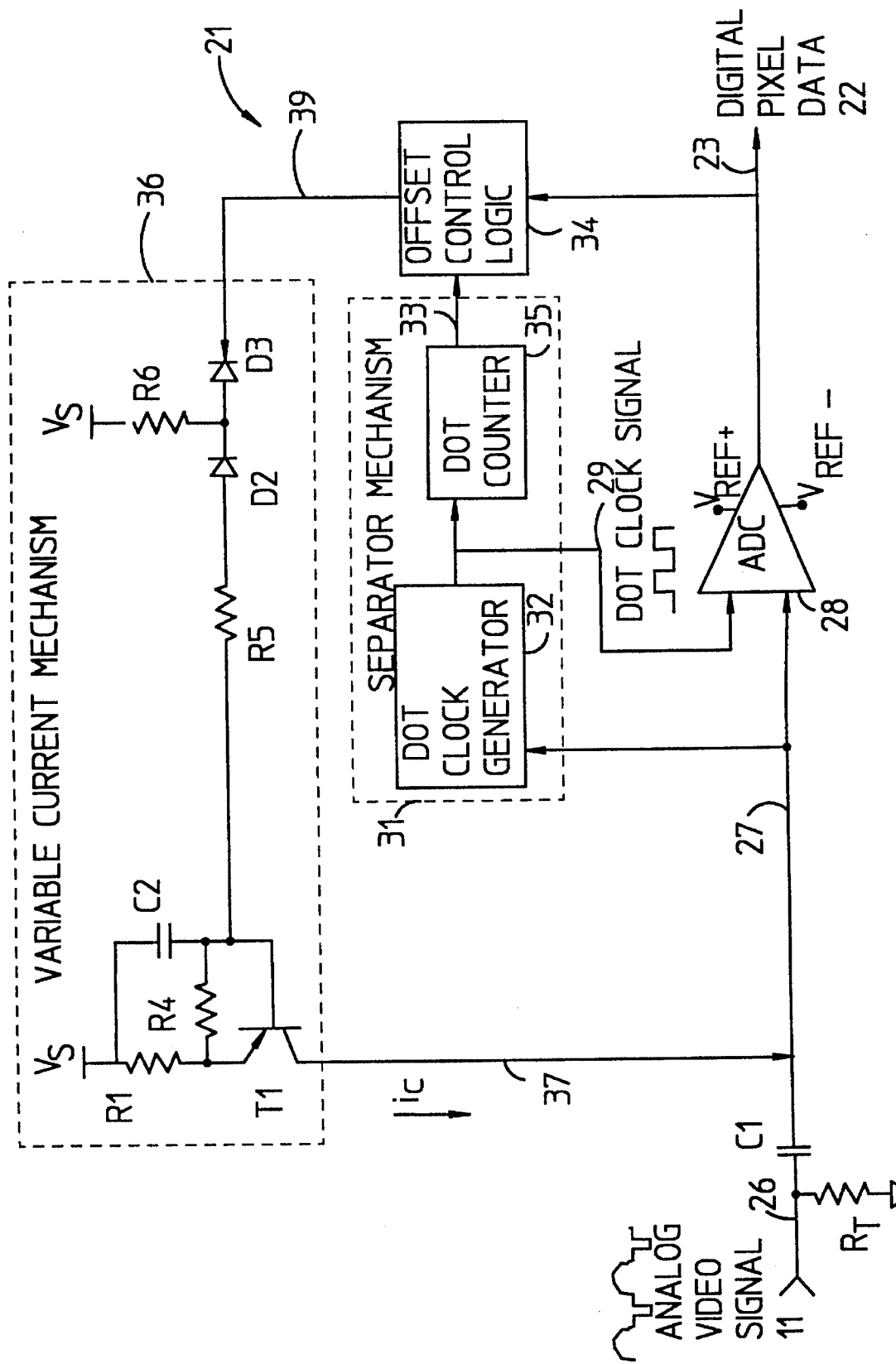
FIG. 3 is a schematic circuit diagram of a voltage shift feedback mechanism in accordance with the present invention.

With reference now to the drawings wherein like reference numerals designate corresponding parts throughout the several views, a voltage shift feedback mechanism 30 in accordance with the present invention is illustrated in FIG. 3. The voltage shift feedback mechanism 30 is utilized in connection with the analog-to-digital convertor (ADC) 28 of FIG. 2 in order to optimally shift, or offset, the analog video signal 11 so that the voltage swing of the analog video signal 11 more closely corresponds with the voltage range of the ADC 28, thereby resulting in a more accurate analog-to-digital conversion of the analog video signal 11. With reference to FIG. 3, significantly, the voltage shift feedback mechanism 30 employs feedback from the digital pixel data 22 in order to shift, or offset, the analog video signal 11 which is input to the analog-to-digital convertor 18. The analog video signal 11 is shifted either up or down relative to the voltage range of the ADC 28, as will be further discussed in detail hereinbelow.

The ADC 28 is preferably a model AD9058 analog-to-digital convertor manufactured and made commercially available from Analog Devices Corporation, U.S.A. Moreover, the ADC voltage range defined by the positive and negative reference voltages $V_{REF+}$, $V_{REF-}$ is set to about 1.5 volts, while the peak-to-peak voltage of the analog video signal 11 is approximately 1 volt. Finally, in the preferred embodiment, the digital pixel data 22 produced by the ADC 28 is a series of 8-bit bytes which range from 0 to 255.

The voltage shift feedback mechanism 30 comprises an input capacitor C1 which communicates the analog video signal 11 on ADC input connection 26 to an ADC input connection 27. The capacitor C1 decouples and isolates the voltage shift feedback mechanism 30 from the incoming analog video signal 11 on the transmission line 24 (FIG. 2) so that the analog video signal 11 may be shifted, or offset. The ADC 28 converts the analog video signal 11 on the ADC input connection 27 to a digital pixel data 22 on ADC output connection 23. A separator mechanism 31 receives the analog video signal 11, determines when the analog video signal 11 is exhibiting a particular amplitude, for example, the blank level 14 (red, green, or blue analog video signal 11), the synchronization level 16 (green analog video signal), or some other suitable amplitude level, and generates a separator output on connection 33 indicative thereof. Offset control logic 34 receives the separator output on connection 33 and digital pixel data 22 on connection 38. From these signals, the offset control logic 34 determines whether or not the particular amplitude of the analog video signal 11 should be increased or decreased based upon the particular value of the digital pixel data 22. A variable current mechanism 36 is connected to the offset control logic 34 and the ADC input connection 27. The variable current mechanism 36 provides an adjustable continuous current $i_c$ onto the ADC input connection 27 under the control of the offset control logic 34.

In some implementations, it may be desirable to supplement the capacitor C1 with another parallel capacitor (not shown). In this configuration, the capacitors would have disparate capacitance values so that the capacitor with the larger capacitance value can handle much charge storage, while the capacitor with the smaller capacitance value can pass high frequency signals. It should be further noted that the prior art input processing system 21 of FIG. 1 cannot be used well in connection with a decoupling capacitor(s) because large voltage and/or current spikes would result from current crossing the capacitor(s) and then passing through the resistor $R_T$ to ground.

The separator mechanism 31 essentially provides timing signals for the system 30 and can be implemented in various ways, but is preferably implemented by using the dot clock generator 32 (FIG. 2) in combination with a pixel counter 35, which is disposed in conventional programmable array logic (PAL). In this configuration, the pixel counter 35 counts an edge(s) in the dot clock signal 16. Because there are 1344 pixels per scan line in the preferred embodiment, i.e., 1344 pixels between sync periods 16', the pixel counter 39 can determine when the analog video signal exhibits the blank and/or sync levels 14, 16 by counting the pixels. In the preferred embodiment, the pixel counter 39 exhibits the functionality set forth in Table A hereafter. In Table A as well as all other tables herein, a "1" and a "0" indicate that the option is true (exists) and false (does not exist), respectively.

TABLE A

| PIXEL COUNT | sync | BLANK |
|---|---|---|
| 0–63 | 0 | 1 |
| 64–127 | 1 | 1 |
| 128–191 | 1 | 1 |
| 192–255 | 0 | 1 |
| 256–319 | 0 | 1 |
| 320–383 | 0 | 0 |
| 384–447 | 0 | 0 |
| . | . | . |
| . | . | . |
| . | . | . |
| 1280–1343 | 0 | 0 |

Although the preferred embodiment of the present invention employs the separator mechanism 31, the separator mechanism 31 is optional and is not essential to practicing the present invention, as will be further described in detail hereinafter.

The variable current mechanism 36 can be implemented in many different ways and with many different current generating systems, as is well known to one with skill in the art. However, in the preferred embodiment, the variable current mechanism 36 comprises a transistor T1 for providing a continuous current $i_c$, approximately between 600 and 620 microamperes (μA), on the output connection 37 connected to the ADC input connection 27. The continuous current $i_c$ initially charges the capacitor C1 to generate the desired offset and then after the capacitor C1 is charged, the current $i_c$ basically matches the ADC input leakage current into the ADC 28 during steady state operation. Thus, the current $i_c$ is greater than the ADC leakage current during power up. Further, the transistor T1 has a low collector capacitance so as to minimize any effect it might have on the analog video signal 11, which could be at high frequency. A resistor R3 connects the T1 emitter to the supply voltage $V_S$, and a capacitor C2 is disposed between the T1 base and the supply voltage $V_S$. The combination of the resistor R3 and the capacitor C2 force the transistor T1 to constantly drive the current $i_c$ by providing constant integration. Importantly, this feature insures that the configuration does not oscillate. Moreover, the gain β of the transistor T1 and the capacitance of the capacitor C2 are such that the voltage across the capacitor C2 will not very much during a scan line so that the current $i_c$ will not fluctuate much during a scan line. Furthermore, biasing resistors R4, R5, R6, and logic diodes D2, D3 decode and interface the digital offset control signal on connection 39 from the offset control logic 34. The resistor R4 also insures that the leakage current through the transistor T1 does not cause the transistor T1 to generate more current $i_c$ than desired. Significantly, because the current $i_c$ runs constantly onto the ADC input connection 27, the voltage on ADC input connection 27 connect to the ADC 28 changes only negligibly during a scan line (at most, typically 40 μV).

Figure 1:
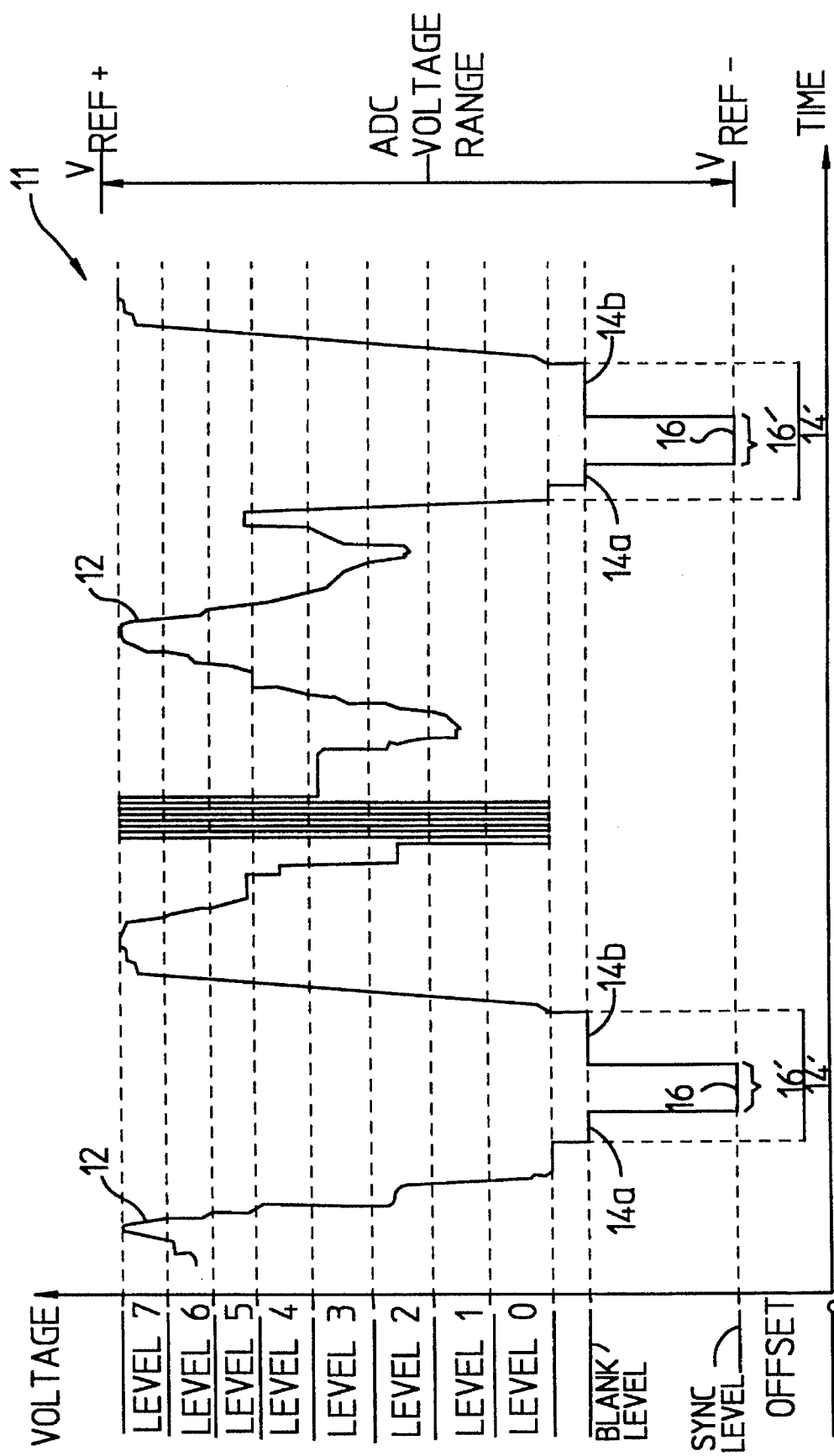
FIG. 1 is a graph of a typical composite analog video signal having blank periods and synchronization periods.

The offset control logic 34 can be implemented in various ways, but is preferably implemented in conventional PAL with the functionality set forth in Table B hereafter. In this first embodiment, the offset control logic 34 is used in connection with an analog video signal 11, as shown in FIG. 1, having sync levels 16. Generally, in an RGB (red, green, blue) color system, the green analog video signal comprises the sync levels 16, whereas the red and blue do not. Hence, this embodiment would be applicable to the offset control logic 34 for processing the green analog video signal 11, as an example.

TABLE B

| Digital Pixel Value On Conn. 23 | Sync Level On Conn. 33 | Offset Control Logic Output On Conn. 39 |
|---|---|---|
| 0–74 | 1 | 0 |
| 75–255 | 1 | 1 |
| 0–255 | 0 | 1 |

The operation of the voltage shift feedback mechanism 30 in the foregoing configuration is as follows. The ADC 28 begins to convert the analog video signal 11 on the ADC input connection 27 to digital pixel data on the ADC output connection 23. The separator mechanism 31 receives the analog video signal 11 and determines when the analog video signal 11 exhibits a particular amplitude, preferably the sync level 16. The offset control logic 34 receives a sync signal via connection 33 indicative of the sync level 16, while also sampling the digital pixel data on ADC output connection 23. When the analog video signal 11 exhibits the sync level 16, the offset control logic 34 determines the value of the digital pixel data on ADC output connection 23 and compares it to a set of predetermined sync value range 74–75. If the value is at or below 74 (between 0 and 74), then the offset control logic 34 controls the variable current mechanism 36 so that the current $i_c$ induced on the ADC input connection 27 is increased. In the alternative, if the value is at or greater than 75 (between 75 and 255), then the offset control logic 34 controls the variable current mechanism 36 so that the current $i_c$ induced on the ADC input connection 27 is decreased. Because of the foregoing procedure, the sync value output from the ADC 28 on ADC output connection 23 will always be tied to and converge toward the range between 74 and 75 (74.5 is optimum) when the analog video signal 11 exhibits a sync period.

The offset control logic 34 can also be implemented in conventional PAL with the functionality set forth in Table C hereafter. In this second embodiment, the offset control logic 34 monitors the blank levels 14 in the incoming analog video signal 11. This configuration is useful when using an analog video signal 11 that does not have sync levels 16, such as in the case of red and blue analog video signals in a typical RGB color processing system. The operation of the offset control logic 34 in the second embodiment is essentially the same as operation in the first embodiment, except that the digital pixel data is compared to a predetermined blank range 123–124 instead of a predetermined sync range 74–75, and accordingly, the discussion relative to the first embodiment is incorporated herein by reference and is equally applicable to the second embodiment. In this second embodiment, the blank value output from the ADC 28 on ADC output connection 23 will always be tied to and converge toward the range between 123 and 124 (123.5 is optimum) when the analog video signal 11 exhibits a blank period 14'. Alternatively, the sync level signal from the green subsystem can be used to trigger the voltage restore of the red and blue analog video signals, thereby making the red, green and blue subsystems symmetric.

TABLE C

| Digital Pixel Value On Conn. 23 | Blank Level On Conn. 33 | Offset Control Logic Output On Conn. 39 |
|---|---|---|
| 0–123 | 1 | 0 |
| 124–255 | 1 | 1 |
| 0–255 | 0 | 1 |

The offset control logic 34 can also be implemented in PAL with the functionality set forth in Table D hereafter. In this third embodiment, the offset control logic 34 uses no timing information, does not monitor the incoming analog video signal 11, and does not need the separator mechanism 31. The third embodiment is used in connection with an analog video signal 11, as shown in FIG. 1, having sync levels 16 (e.g., green analog video signal). The offset control logic 34 merely samples and examines the lowest value (value corresponding to sync level 16) of the digital pixel data on the connection 23.

TABLE D

| Digital Pixel Value On Conn. 23 | Lowest Ampl. On Conn. 23 | Offset Control Logic Output On Conn. 39 |
|---|---|---|
| 0–74 | 1 | 0 |
| 75–255 | 1 | 1 |
| 0–255 | 0 | 1 |

The operation of the voltage shift feedback mechanism 30 in the third embodiment is as follows. The ADC 28 begins to convert the analog video signal 11 on the ADC input connection 27 to digital pixel data on the ADC output connection 23. The offset control logic 34 continuously samples the digital pixel data on ADC output connection 23. When the digital pixel data on connection 23 exhibits the lowest value, then the offset control logic 34 compares the value to a predetermined value range, which in this case is a predetermined sync value range of 74–75. When the value is at or less than 74 (between 0 and 74), then the offset control logic 34 controls the variable current mechanism 36 so that the current $i_c$ induced on the ADC input connection 27 is increased. In the alternative, if the value is at or greater than 75 (between 75 and 255), then the offset control logic 34 controls the variable current mechanism 36 so that the current it induced on the ADC input connection 27 is decreased. Because of the foregoing procedure, the sync value output from the ADC 28 on ADC output connection 23 will always be tied to and converge toward the predetermined sync range between 74 and 75 (74.5 is optimum) when the analog video signal 11 exhibits a sync period 16'.

The offset control logic 34 can also be implemented in PAL with the functionality set forth in Table E hereafter. In this fourth embodiment, the offset control logic 34 again uses no timing information, does not monitor the incoming analog video signal 11, and does not need the separator mechanism 31. The fourth embodiment is used in connection with an analog video signal 11 having no sync levels 16, but only blank levels 14 (e.g., red and blue analog video signals). The offset control logic 34 merely samples and examines the lowest value (value corresponding to the blank level 14) of the digital pixel data on the connection 23.

TABLE E

| Digital Pixel Value On Conn. 23 | Lowest Ampl. On Conn. 23 | Offset Control Logic Output On Conn. 39 |
|---|---|---|
| 0–123 | 1 | 0 |
| 124–255 | 1 | 1 |
| 0–255 | 0 | 1 |

The operation of the voltage shift feedback mechanism 30 in the fourth embodiment is as follows. The ADC 28 begins to convert the analog video signal 11 on the ADC input connection 27 to digital pixel data on the ADC output connection 23. The offset control logic 34 continuously samples the digital pixel data on ADC output connection 23. When the digital pixel data on connection 23 exhibits the lowest value, then the offset control logic 34 compares the value to a predetermined value range, which in this case is a predetermined blank value range of 123–124. When the value is less than 123 (between 0 and 123), then the offset control logic 34 controls the variable current mechanism 36 so that the current $i_c$ induced on the ADC input connection 27 is increased. In the alternative, if the value is greater than 124 (between 124 and 255), then the offset control logic 34 controls the variable current mechanism 36 so that the current it induced on the ADC input connection 27 is decreased. Because of the foregoing procedure, the sync value output from the ADC 28 on ADC output connection 23 will always be tied to and converge toward the predetermined blank range between 123 and 124 (123.5 is optimum) when the analog video signal 11 exhibits a blank period 14'.

It will be obvious to those skilled in the art that many variations and modifications can be made to the embodiments described hereinbefore without substantially departing from the spirit and scope of the present invention. Accordingly, all such variations and modifications are intended to be included herein within the scope of the present invention, as set forth in the following claims.

Wherefore, the following is claimed:

1. A voltage shift feedback mechanism for shifting the signal amplitude of an analog video signal so that a more accurate analog-to-digital conversion of the analog video signal is achieved, comprising:

an analog-to-digital convertor having an input for receiving said analog video signal, said analog-to-digital convertor for generating digital pixel data;

variable current means connected to said input, said variable current means for supplying a continuous current to said analog video signal so that said analog video signal is shifted in amplitude; and an offset control means for receiving said digital pixel data, said offset control means for comparing said digital pixel data to a predetermined range, said offset control means for adjusting said continuous current so that said digital pixel data converges toward said predetermined range.

2. The system of claim 1, wherein said offset control means compares said digital pixel data to a predetermined synchronization range when said digital pixel data exhibits a lowest value.

3. The system of claim 1, wherein said offset control means compares said digital pixel data to a predetermined blank range when said digital pixel data exhibits a lowest value.

4. The system of claim 1, further comprising a separator means for receiving said analog video signal and for generating a separator output indicative of when said analog video signal exhibits a particular amplitude and wherein said offset control means compares said digital pixel data to said predetermined range when said analog video signal exhibits said particular amplitude.

5. The system of claim 1, wherein said current is continuously applied to said analog video signal by said variable current means.

6. The system of claim 1, further comprising a capacitor for communicating said analog video signal to said convertor and to said variable current means.

7. The system of claim 4, wherein said particular amplitude corresponds with a synchronization level.

8. The system of claim 4, wherein said particular amplitude corresponds with a blank level.

9. A voltage shift feedback method for shifting the signal amplitude of an analog video signal so that a more accurate analog-to-digital conversion of the analog video signal is achieved, comprising the steps of:

converting said analog video signal to digital pixel data;

supplying a continuous current to said analog video signal so that said analog video signal is shifted in amplitude;

comparing said digital pixel data to a predetermined range; and adjusting said continuous current so that said digital pixel data converges toward said predetermined range.

10. The method of claim 9, further comprising the step of comparing said digital pixel data to a predetermined synchronization range when said digital pixel data exhibits a lowest value.

11. The method of claim 9, further comprising the step of comparing said digital pixel data to a predetermined synchronization range when said digital pixel data exhibits a lowest value.

12. The method of claim 9, further comprising the steps of:

determining when said analog video signal exhibits a particular amplitude; and comparing said digital pixel data to a predetermined value when said analog video signal exhibits said particular amplitude.

13. The method of claim 9, further comprising the step of comparing said digital pixel data to said predetermined range when said analog video signal exhibits a synchronization period.

14. The method of claim 9, further comprising the step of comparing said digital pixel data to said predetermined value when said analog video signal exhibits a blank period.

15. The method of claim 9, further comprising the step of passing said analog video signal through a capacitor prior to converting said analog video signal to said digital pixel data.

16. The method of claim 9, further comprising the step of supplying said current continuously to said analog video signal.

* * * * *